US008271487B1

(12) United States Patent
Hermush et al.

(10) Patent No.: US 8,271,487 B1
(45) Date of Patent: Sep. 18, 2012

(54) HYPERVIDEO TRACKING AND REPORTING SYSTEM

(75) Inventors: Yossi A. Hermush, Tel-Aviv (IL); Rottem Keret, Shchenia (IL); Shmuel Weller, Tel Aviv (IL); Dror Harel, Zoran (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 2015 days.

(21) Appl. No.: 09/721,503

(22) Filed: Nov. 22, 2000

Related U.S. Application Data (60) Provisional application No. 60/167,165, filed on Nov. 23, 1999.

(51) Int. Cl.
*G06F 17/30* (2006.01)
(52) U.S. Cl. ............................................ 707/734; 725/9
(58) Field of Classification Search .................. 707/734, 707/603
See application file for complete search history.

(56) References Cited

U.S. PATENT DOCUMENTS

| 5,727,129 | A | | 3/1998 | Barrett et al. | |
| 5,819,092 | A | * | 10/1998 | Ferguson et al. | ............. 717/113 |
| 5,948,061 | A | | 9/1999 | Merriman et al. | |
| 6,151,601 | A | | 11/2000 | Papierniak et al. | |
| 6,516,329 | B1 | * | 2/2003 | Smith | ........................... 715/210 |

FOREIGN PATENT DOCUMENTS

| EP | 0957437 A2 | 11/1999 |
| WO | 9804984 A1 | 2/1998 |
| WO | 9910822 A1 | 3/1999 |

* cited by examiner

*Primary Examiner* — Rehana Perveen
*Assistant Examiner* — Alexander Khong (57) ABSTRACT

A system for tracking and reporting of user behavior including tracking and recording of media viewed by a user. The media may include hypervideo video-enhanced pages and other media types. The system is operable to create a user-configurable report including data regarding user use of the media, such as indicating the number of times each media has been viewed and indicating the number of times each path has been taken through each hypervideo application.

84 Claims, 7 Drawing Sheets

FIG. 1
Report by Application

| Application | Mon | Tue | Wed | Thu | Fri | Sat | Sun |
|---|---|---|---|---|---|---|---|
| Click a Toy | 1000 | 1699 | 2110 | 1150 | 1200 | 1324 | 2455 |
| Gear View | 1201 | 2320 | 1340 | 2409 | 520 | 1622 | 2340 |
| Romancing America | 994 | 1999 | 2200 | 850 | 1000 | 1624 | 2555 |
| Total | 3195 | 6018 | 5650 | 4409 | 2720 | 4570 | 7350 |

Report by day of week - table

FIG. 2

Most Popular Video Enhanced Pages [VEP]

| Type | Name | Video views | User Sessions | Unique Users | Average Time per view (sec) |
|------|------|-------------|---------------|--------------|------------------------------|
|      |      |             |               |              |                              |
|      |      |             |               |              |                              |
|      |      |             |               |              |                              |

Top Path Through Application

| User Sessions | Unique Users | % of Total | Total time(s) | |
|---|---|---|---|---|
| 100 | 81 | 24.1 | 5 | |
| 31 | 18 | 8.8 | 18 | |
| 24 | 23 | 6.2 | 66 | |
| 17 | 16 | 4.1 | 64 | |
| 401 | 402 | 403 | 405 | |

| Hotspot | Media | Overlay | Views | Mouse Entries | Clicks | Clicks / Views % | Mouse Entries / Views % | Clicks / Mouse Entries % | Avg. Time |
|---|---|---|---|---|---|---|---|---|---|
| Lego | Main Aisle | Filter: Highlight | 800 | 1500 | 1000 | 30 | 60 | 50 | 00:02:30 |
| Toddlers | Main Aisle | Image: Todd.gif | | | | | | | |
| Lego1 | Lego Aisle | — | | | | | | | |
| Back | Lego Aisle | Filter: Translucent | | | | | | | |

| Image | Size | Click-through URL | Views | Click-through | Click-through % | Avg. time |
|---|---|---|---|---|---|---|
| Shampoo.gif | 30x81 | http://pantene.com/index.htm | 40(30) | 10(10) | 25(33) | 00:01:03 |
| Bonzo.gif | 95x03 | http://dogs.com | 50(20) | 20(10) | 40(50) | 00:00:09 |

| Hotspot Name | Media Name | Ad Server URL |
|---|---|---|
| Shampoo | Aisle 1 | http://myaddserver/?Parm1=rr&parm2=ttt |
| Dog | Aisle 2 | http://myaddserver/?Parm1=rr&parm2=ttt |

FIG. 7

HYPERVIDEO TRACKING AND REPORTING SYSTEM

CLAIM OF PRIORITY

This application claims priority from U.S. provisional application 60/167,165, filed Nov. 23, 1999, titled "Hypervideo Suite".

FIELD OF THE INVENTION

The invention relates generally to a hypervideo system incorporating hot links within a video presentation, and more specifically to a hypervideo tracking and reporting system.

INCORPORATION OF RELATED MATTERS

This application hereby incorporates by reference related pending U.S. patent application Ser. Nos. 09/200,146, filed Nov. 25, 1998, titled "Streaming Hypervideo and Dynamic Hypervideo"; and 08/882,512, filed Jun. 25, 1997, titled "System and Method for Linking Information to and Accessing Information From a Video".

BACKGROUND OF THE INVENTION

As personal computers and access to the Internet have become increasingly common, computers have become more widely relied upon for communication. Businesses provide product information, customer support, and ordering capability via the Internet, e-mail is widely used for personal and business communication via the Internet in place of telephone or postal mail, and discussions relating to a wide variety of specific topics are conducted in Internet-based discussion groups. As technology and access to the Internet continue to increase, it is reasonable to expect that communication via the Internet will continue to increase in popularity and the methods in which the Internet is used to communicate will continue to expand.

Web pages or websites comprising a part of the World Wide Web (WWW) are perhaps the most common means of posting information for mass viewing or for providing services such as e-commerce ability to the public at large. Web pages are defined via a markup language that can be transmitted via the Internet to website users, who run web browser applications that interpret the markup language information and render web pages on the user computer systems. Markup languages such as HTML allow presentation of text, graphics, menus, tables, and other useful structures to users via the Internet connections that link web page servers and user client systems running web browser applications. One common feature incorporated into web pages is known as a "Hyperlink", which is typically text or a graphic representing other content, that when clicked on using a mouse cursor or otherwise selected loads and presents the represented other content.

But, as bandwidth and computational power in computerized systems continue to increase, the types of information presented via the World Wide Web and other sources continues to advance. Now, it is not uncommon to find relatively large and complex streaming audio or video broadcasts of content in addition to more traditional text and still image content, and such content continues to become more common. However, content such as video has typically been presented as a stand-alone presentation, without incorporating links to other content.

The concept of Hypervideo seeks to provide this hyperlink-type functionality to video presentations, enabling linking and retrieval of information related to objects or images presented in a video presentation. For example, a user watching a football game may move a cursor over a player and click on the player's image to see statistics on that player, or may similarly select a product in a commercial or television show for more information on the product.

Hypervideo capability is currently provided via a proprietary hypervideo software system called Hypervideo Suite. This software provides a multimedia designer the tools to create video with hyperlinks, such as may be viewable over the Internet or other broadband network using a hypervideo player or other media viewer. Incorporation of hyperlinks into video using Hypervideo Suite technology is hoped to become the preferred method of providing hyperlinks in video content as broadband network access becomes commonplace.

But, along with tools to facilitate providing hypervideo content, it is desirable to track the use of such content. Because such content remains relatively expensive to produce and distribute, evaluation of commercial effectiveness of hypervideo content for various applications is key to cost-effective or profitable use of hypevideo. Tracking use of content can serve a variety of other functions, such as tracking progress of training or educational material. While web servers often provide statistics on the number of times selected elements have been downloaded and other such information, they do not track a user's progress through a series of links where the links include clicking through hotspots or links in video, or provide other information key to understanding how content is used.

What is needed is a system that is capable of tracking and reporting user behavior in a Hypervideo system.

SUMMARY OF THE INVENTION

The present invention facilitates tracking and reporting of user behavior in a hypervideo system. The system provides tracking and recording of media viewed by a user, where media comprises hypervideo video-enhanced pages and other media types. The system is operable to create a user-configurable report, comprising data regarding user use of the media, such as indicating the number of times each media has been viewed and indicating the number of times each path has been taken through each hypervideo application.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides in various embodiments a system facilitating tracking and reporting of user actions in a hypervideo system. The system provides tracking and recording media viewed by a user, where media comprises hypervideo video-enhanced pages (VEPs) and other media types. The system is operable to create a user-configurable report, indicating data relating to user access of the media such as the number of times each media has been viewed and the number of times each path has been taken through each hypervideo application.

Hypervideo is a system enabling linking information to and accessing information from a video. Hypervideo contains one or more regions of interest, or hotspots, where each hotspot is linked to one or more targets. Hypervideo permits a user to interact with video, by selecting hotspots to retrieve selected information or perform other actions associated with the image the hotspot represents. The user can navigate hypervideo from any base such as HTML, an image, video, or other media types, and may similarly retrieve from within hypervideo any type of media. The media targets viewed from within hypervideo may be viewed or executed serially, simultaneously, or in any other manner.

An authoring tool is used to create hotspots within video to create hypervideo applications by defining regions of interest and associating those regions with other media content. The hotspot similarly may be defined in a picture, such as a bitmap graphic image. The hotspot may then be selected by a user, such as by placing a mouse cursor over the hotspot and clicking the mouse. Upon activation, the linked media associated with the hotspot is viewed or executed. Multiple media may be linked to a hotspot in some embodiments of the invention, so that selecting or actuating a hotspot retrieves or executes one or more different linked media.

Hypervideo media hotspots and media content may be initiated via user selection such as by mouse click, may be actuated via automatic activation such as an API call in a Javascript program, or in any other way in various embodiments of hypervideo systems.

Hypervideo in one embodiment of the invention will be provided to a user via a server providing content over a broadband network, and the users of hypervideo will view hypervideo content using hypervideo content viewer applications or hypervideo viewer plugin applications within standard web browsers. Other embodiments may include delivery of hypervideo content via machine-readable mediums such as CDs, or via any other method of delivering content to a user. The hypervideo content may also be viewed in some embodiments using standard viewers, rather than dedicated or proprietary hypervideo viewers.

Hypervideo will be useful in a variety of applications, such as interactive television, games, tourism information, and home shopping. It is anticipated that due to the flexibility of the hypervideo system, a variety of other applications exist and will be developed, all of which are consistent with and within the scope of the present invention.

A hypervideo application provides a tree of media that includes video-enhanced pages, where video-enhanced pages are pages of content that are displayed or otherwise presented to a user. For example, video, images, audio, or HTML pages may be video-enhanced pages, if they are pages that form a part of the sequence of content displayed by the hypervideo application. The video-enhanced page (VEP) is further defined as the hypervideo application executes as only that content that is currently being displayed in the front or current level of the application. In some embodiments of the invention, when more than one element of content or media are displayed at a time, the VEP is the content type that has the highest priority or that is displayed as a larger representation. Content types are ordered in one such embodiment so that video is the highest priority, followed sequentially by images, audio, and HTML pages.

Tracking and reporting of hypervideo content is acomplished via a novel tracking and reporting system. When a user requests a hypervideo VEP or media, the request is logged and the time the VEP is viewed is recorded. The logged information may be automatically analyzed to create performance statistics, to alter the operation of the server, or to perform other functions, but is also available to a reporting tool that is operable to perform functions such as reporting and summarizing information about the hypervideo media.

Figure 1:
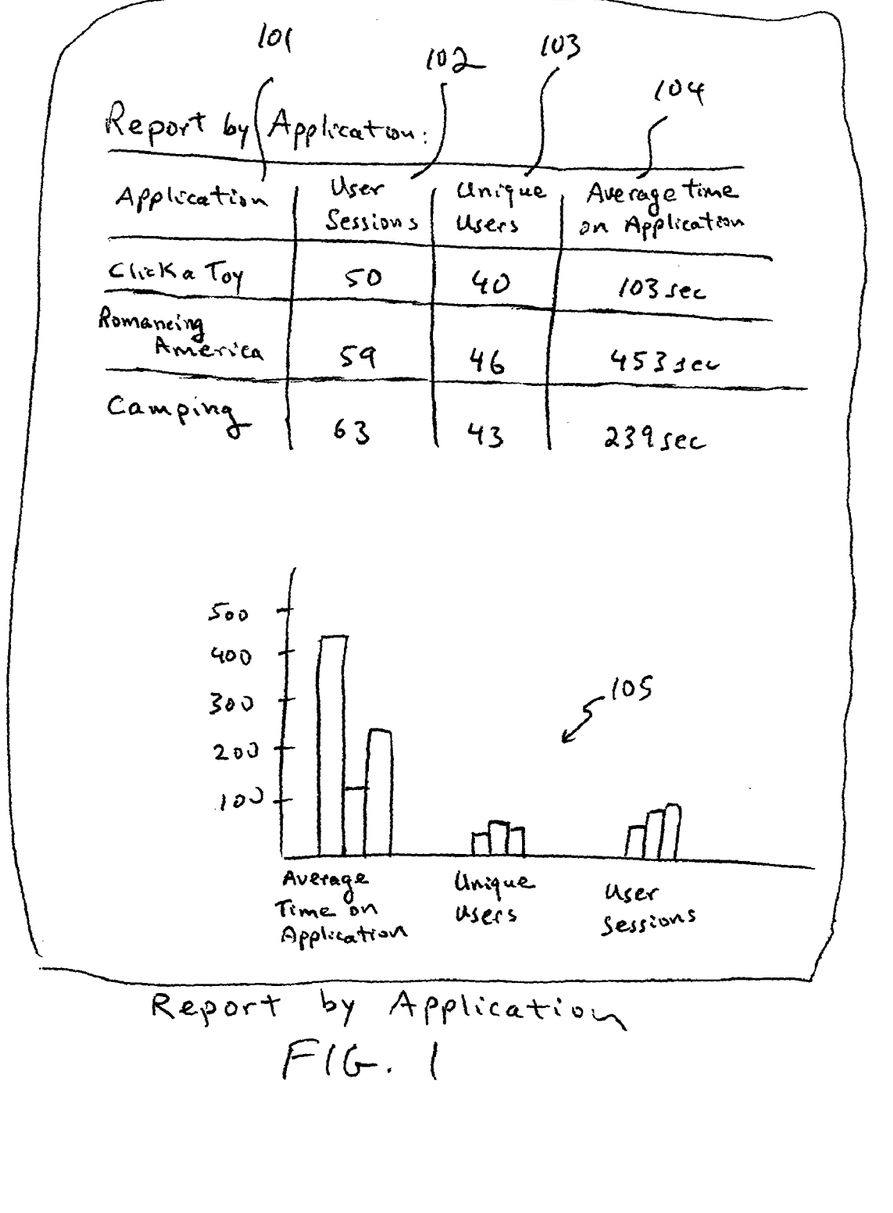
FIG. 1 is a computer screen image of a hypervideo application report, consistent with an embodiment of the present invention.

One example of a hypervideo application report is shown in FIG. 1. The screen image of FIG. 1 shows the applications listed at 101, and shows for each application displayed the number of user sessions during which the application was executed at 102. At 103, the number of unique users to have viewed each application is displayed, and the average time each user spends within each application is shown at 104. In some further embodiments of the invention, some or all of this information is presented graphically, as is shown at 105.

Figure 2:
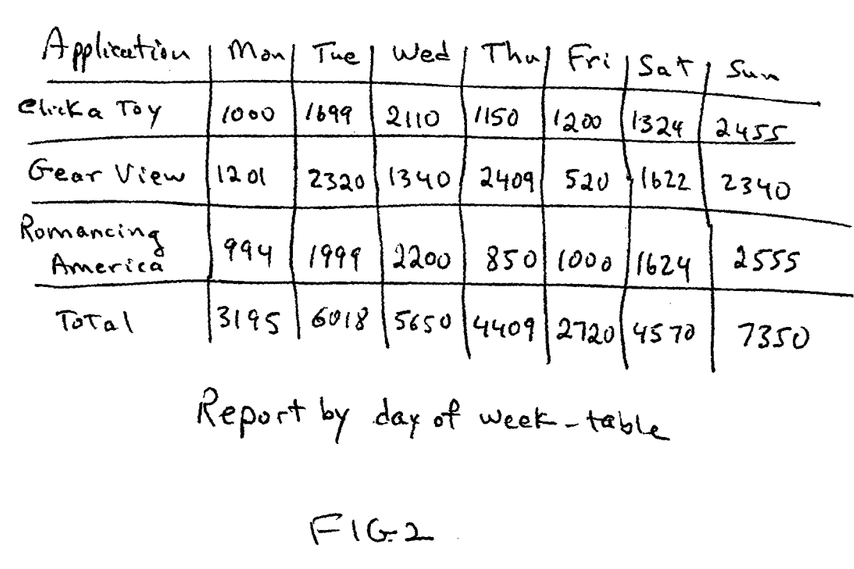
FIG. 2 is a table illustrating application executions for each application sorted by day of the week the execution occurred, consistent with an embodiment of the present invention.

This information is also viewable sorted by time of day, day of the week, or other criteria as is shown in FIG. 2. FIG. 2 shows generally a table illustrating an example embodiment of the present invention in which application executions are listed by day of the week, which may allow a hypervideo system provider to better understand demand and use of the hypervideo media content provided.

Figure 3:
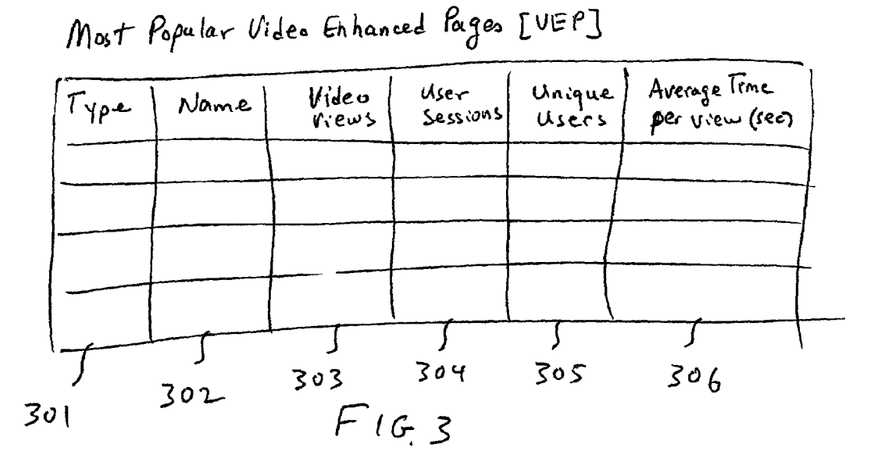
FIG. 3 illustrates a computer screen image that represents a video-enhanced page report generated consistent with an embodiment of the present invention.

FIG. 3 illustrates a computer screen image that represents a video-enhanced page (VEP) report generated consistent with the present invention. Each video enhanced page listed in the table is represented both by an icon indicating the media type at 301, and a name at 302. Ideally, the name will be descriptive of the content of the media, to facilitate user interpretation of the report. At 303, the number of views of each media (including VEP) listed in the report is shown, and the number of user sessions during which each media was viewed is listed at 304. At 305, the report table indicates the number of unique users to have viewed each media, and the average time that users view each listed media is shown at 306. Media other than VEP media are included in the embodiment of the invention shown in FIG. 3 for a variety of reasons, including representation of media viewed while not in the front or current position as is required in some embodiments for media to be considered a VEP.

The user may configure the report tool in some embodiments of the invention to report data for only selected types of media, to display statistics for only certain dates, or to otherwise select the type of data presented in a report. For example, a user may wish to view data starting at the first day of the current month for VEP media only, and may create a custom report including only such data.

In a further embodiment of the invention, the number of times each media has been viewed as shown at 303 of FIG. 3 does not include returning to a media in a single session where the media path brings a user back to a media. In this manner, double-viewing of media that causes a user to view other content and then return does not skew the statistics presented in the report.

The report may also be limited in some embodiments to showing statistics for only a selected number of top or bottom-ranked applications. For example, a report may be limited to the most frequently viewed 20 applications on a server. This flexibility allows the user to further customize reports and derive additional information from the reporting tool.

For looping media such as video or audio, the number of total views and the number of distinct views not resulting from looping may be indicated, so that the number of views reported is not distorted by the looping process. For example, a video viewed 120 times total but only 40 times in distinct views not a result of looping indicates that the video looped three times on average each time it was played.

The statistics screen may further indicate in select embodiments of the invention the reason for the media start or presentation. For example, an automatic start from an application, a hotframe, or an end-of-media triggered start may be reported individually or as automatic starts, and hotlinks, API calls, and hotspot activations may be reported separately or as user-triggered starts. This information may be summarized or otherwise characterized such as by icon in further embodiments of the invention.

Figure 4:
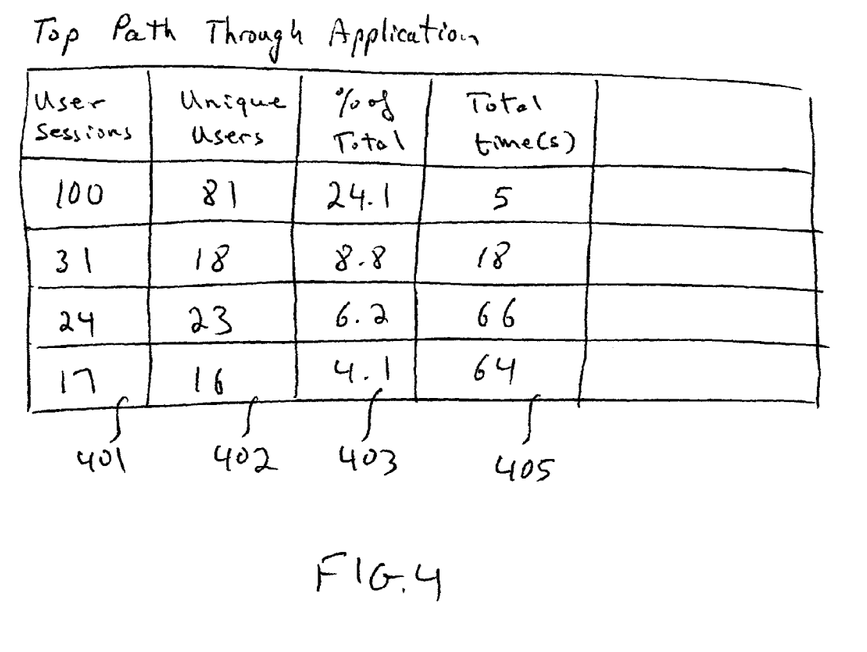
FIG. 4 illustrates a report indicating the media path taken through each application, consistent with an embodiment of the present invention.

FIG. 4 illustrates a report indicating the media path taken through each application, listed in order of the total number of user executions of each application following each path displayed. A path is defined in the embodiment of the invention illustrated in FIG. 4 as the page flow of the application from start to end of a user session, including VEPs and other media. The number of user sessions per application path is shown at 401, and the number of unique users following each application path is shown at 402. At 403, the percentage of total application executions that took each path is listed, indicating which paths through the application are most common. The average amount of total time spent taking each path is listed at 405.

The report shown in FIG. 4 is in some embodiments user-configurable to include or present data in a way the user desires. For example, a minimum path length may be defined by the user, so that paths taken through an application not meeting or exceeding the minimum number of media or VEPs viewed will not be displayed in the report. Also, paths that are not entirely identical may be grouped together for reporting purposes if the have selected path segments in common. In such an embodiment, a user may choose to group all paths that have the first five elements in common, or may choose to group paths that have some other selected segment in common, so that they will be aggregated and single path statistics will be displayed for each group.

As is shown at 405, the path taken through an application may be represented by icons representing each media or VEP in the path. In alternate embodiments, media names, icons, or other methods may be employed to uniquely identify each path within the report. Icons may be used in some embodiments of the invention to visually represent additional data, such as what triggered a hotspot activation, different media types, or other data.

Figure 5:
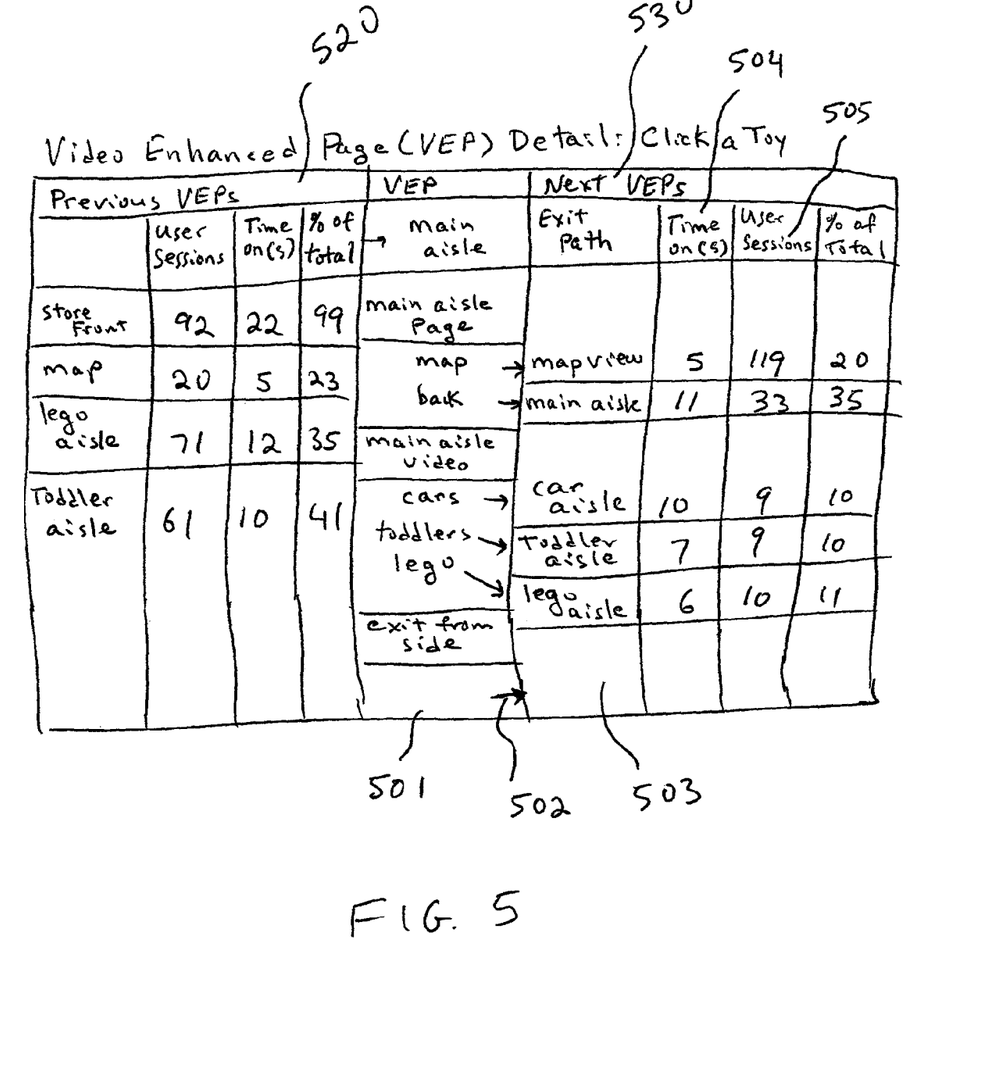
FIG. 5 shows a path detail report screen image, consistent with an embodiment of the present invention.

A path report is provided in some embodiments of the invention, as is shown at FIG. 5. The path report shown in FIG. 5 shows only VEPs, but the invention in alternate embodiments also includes other media. The report shows at 501 a list of media contained in a currently-displayed VEP, and the hotspots on each media. Data regarding previous VEPs which led to the current VEP is shown generally at 520, and data relating to the VEPs selecte from the current VEP is shown generally at 530. The links from the various hotspots in the currently-displayed VEP or media to other VEP or media 503 are shown at 502, along with various statistics regarding the frequency and time users progress from the current media to each of the next linked media. The average time a user spends after progressing to each of the next media is shown in table form at 504, and the total number of user sessions or application executions in which a user proceeds to each media is listed at 505. At 506, the percentage of total media selections attributed to each media is shown, indicating which paths are most likely to be taken.

Figure 6:
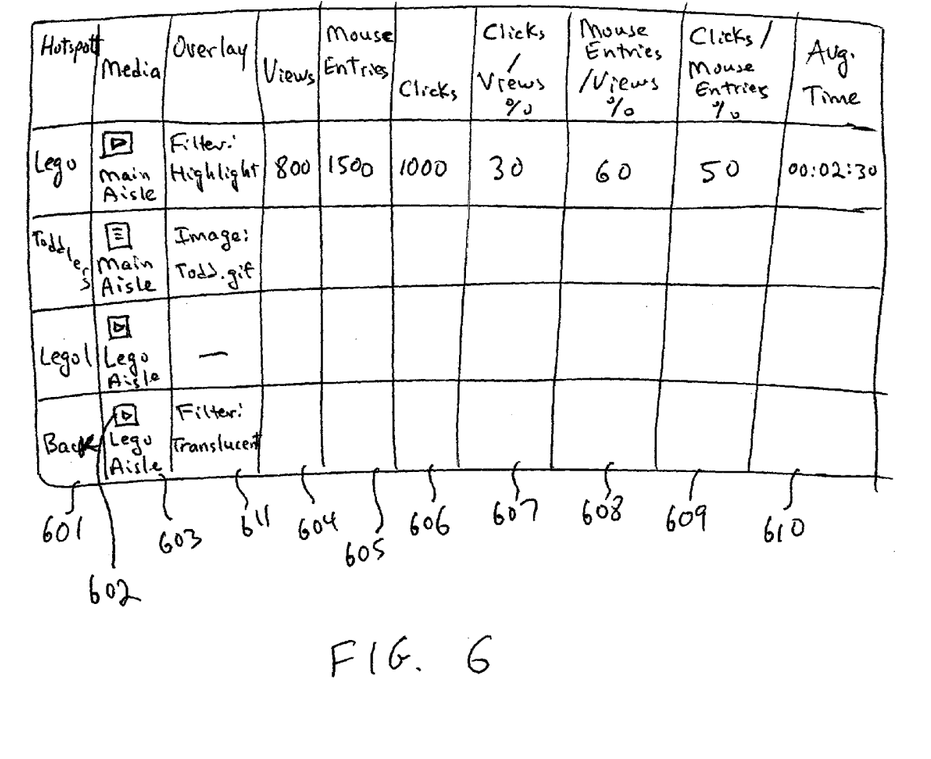
FIG. 6 is a screen image of a hotspot report, consistent with an embodiment of the present invention.

This path detain report therefore shows both how users arrived at the current VEP and the paths users took from the current VEP, indicating paths that are effective and desira FIG. 6 is a table that shows a detailed hotspot report, showing statistics for the most frequently selected hotspots in an application. In other embodiments of the invention, a hotspot report may comprise statistics for hotspots meeting certain use or date criteria, or other criteria selected by a user. The report shows statistics reflecting the use of each hotspot, including each hotspot name at 601, type at 602, and location at 603. The number of sessions or application executions in which each hotspot is viewed is shown at 604, and the number of movements to each hotspot via use of a mouse (whether the hotspot was actuated or not) is shown at 605. The number of times each hotspot is clicked on is shown at 606, and the percentage of viewers that clicked each hotspot is shown at 607. The percentage of viewers entering the hotspot-linked media via mouse is shown at 608, and the percentage of users entering the hotspot-linked media by clicking the mouse is shown at 609. Also, the average time each hotspot is viewed by a user is shown at 610.

Overlay data is shown at 611, indicating the overlay for each listed hotspot. Overlays are used to mark hotspots in the media presentations, and may comprise an image that appears on or near a hotspot, a cursor that changes when passed over a hotspot, or no marking at all. Other overlays are possible, such as altering the contrast or brightness of a hotspot or marking the hotspot in other ways, and are within the scope of overlays for purposes of this application.

Figure 7:
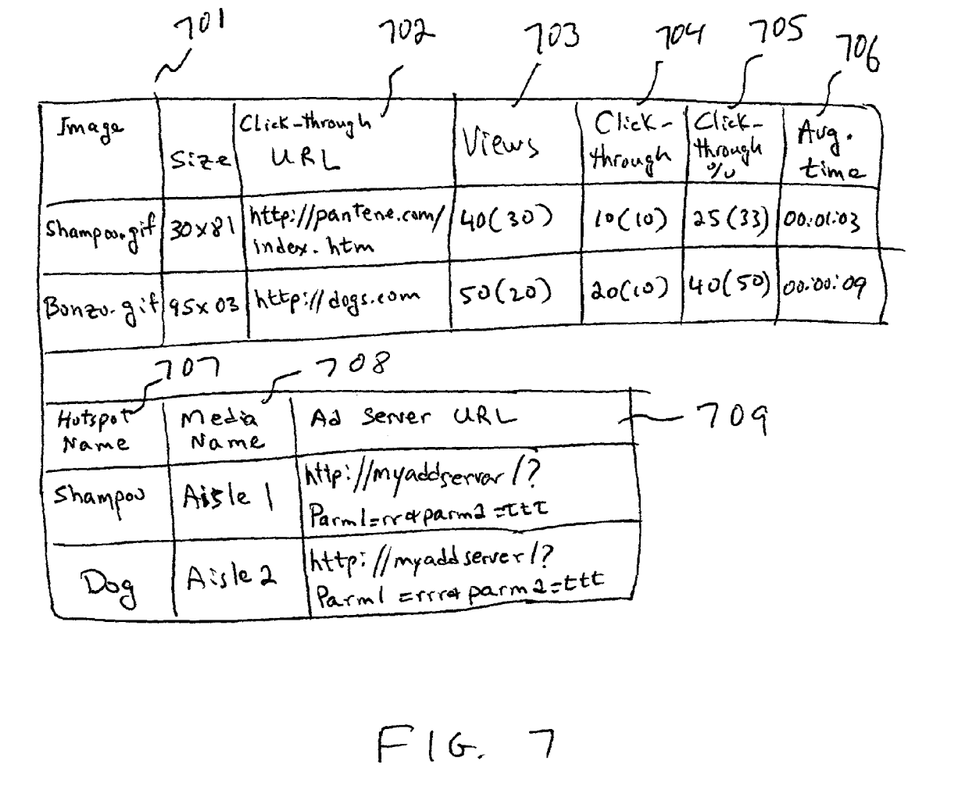
FIG. 7 is a screen image of an advertising media hotspot report, consistent with an embodiment of the present invention.

FIG. 7 illustrates a special version of a hotspot media report comprising data only on media that is advertising media. The advertising image name and size are shown at 701, and the click-through URL the hotspot link links to is shown at 702. The number of times each advertising image was retrieved within a user session is shown at 703, with the number of times each image was retrieved by a unique user shown in parenthesis. The number of sessions in which the hotspot was clicked is shown at 704, and the number of unique user clicks is shown in parenthesis. At 705, the click-through percentage shows the percentage of user sessions that result in a click-through, along with the percentage of click-throughs by unique user in parenthesis. The average time spent viewing the advertising image is shown at 706, and the hotspot name is shown at 707. The media name of the media that contains the ad is shown at 708, which is typically video. Finally, the URL of the advertisement on the ad server is shown at 709. In alternate embodiments of the invention, advertising pages may be displayed along with other media in a media report, and may be individually selected for display by user-configuration of the media report.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A method of providing hypervideo application user information, comprising the acts of:
   tracking and recording media viewed by a user, wherein the media comprises hypervideo applications; and
   creating a user-configurable report, the report reflecting data regarding user access of the media,
   wherein the creating act further comprises the acts of:
   indicating, for each video-enhanced page in a hypervideo application, information regarding previous video-enhanced pages users viewed before a current video-enhanced page and from which the users proceeded to the current video-enhanced page;
   indicating information regarding next video-enhanced pages to which the users proceeded from the current video-enhanced page; and
   simultaneously displaying on a display the information regarding the previous video-enhanced pages, a list of media contained in the current video-enhanced page, and the information regarding the next video-enhanced pages,
   wherein the information regarding the previous video-enhanced pages comprises information regarding how viewing the current video-enhanced page was initiated, including one of user initiated and automatic activation, and paths the users took from the previous video-enhanced pages to the current video-enhanced page,
   wherein the information regarding the previous video-enhanced pages comprises percentage of total times when viewing the previous video-enhanced pages that users proceeded to the current video-enhanced page, and
   wherein the information regarding the next video-enhanced pages further comprises percentage of total views of the current video-enhanced page that result in a user proceeding to each of the next video-enhanced pages.

2. The method of claim 1, wherein the user-configurable report comprises a report including data after a user-defined start date.

3. The method of claim 1, wherein the user-configurable report comprises a report including data before a user-defined end date.

4. The method of claim 1, wherein the report data comprises a number of times each media has been viewed.

5. The method of claim 1, wherein the media further comprises at least one of video, image, HTML or audio.

6. The method of claim 5, wherein the user configures which of the media types are to be included in the report.

7. The method of claim 5, wherein each type of the media is identified in the report via representation with a unique icon.

8. The method of claim 4, wherein the number of times each media has been viewed does not include returning to a media in a path in a same session.

9. The method of claim 1, wherein the number of media for which data is displayed in the report is selected by the user.

10. The method of claim 1, wherein the report comprises a number of user sessions during which the media was viewed.

11. The method of claim 1, wherein the report comprises a number of unique users to view a media.

12. The method of claim 1, wherein the report comprises an average time users spent viewing each media.

13. The method of claim 1, wherein the report sorts media by a number of times each media has been viewed.

14. The method of claim 4, wherein the number of times each media has been viewed comprises both a total number of times a looping video has been viewed including views that result from looping, and a number of times the looping video has been viewed not as a result of looping.

15. The method of claim 1, wherein the report comprises an indication of whether views of a particular media were user-initiated or automatic.

16. The method of claim 1, wherein the report comprises an indication of whether video media is looping media.

17. The method of claim 1, wherein the report further reflects a number of times each path has been taken through each hypervideo application.

18. The method of claim 17, wherein indicating the number of times each path has been taken through each hypervideo application comprises displaying data for a user-selected number of paths.

19. The method of claim 17, wherein indicating the number of times each path has been taken through each hypervideo application comprises indicating data for only those paths exceeding a user-defined minimum path length.

20. The method of claim 17, wherein indicating the number of times each path has been taken through each hypervideo application comprises grouping paths together based on a user-defined number of same first pages in each path.

21. The method of claim 1, wherein the information regarding the previous video-enhanced pages comprises data regarding the identity of the previous video-enhanced pages viewed before and linked to the current video-enhanced page.

22. The method of claim 1, wherein the information regarding the previous video-enhanced pages comprises the average time users spent viewing the previous video-enhanced pages before proceeding to the current video-enhanced page.

23. The method of claim 1, wherein the information regarding the previous video-enhanced pages comprises the number of user sessions for each previous video-enhanced page from which users have proceeded to the current video-enhanced page.

24. The method of claim 1, wherein the information regarding the next video-enhanced pages comprises information about each hotspot on the current video-enhanced page and the next video-enhanced pages to which the hotspots are linked.

25. The method of claim 24, wherein the information regarding the next video-enhanced pages comprises the media to which each hotspot is linked.

26. The method of claim 24, wherein the information regarding the next video-enhanced pages further comprises an average time a user spends viewing the current video-enhanced page before progressing to each of the next video-enhanced pages.

27. The method of claim 24, wherein the information regarding the next video-enhanced pages further comprises a number of user sessions in which a person proceeds from the current video-enhanced page to each of the next video-enhanced pages.

28. The method of claim 1, wherein the user-configurable report further comprises a hotspot report.

29. The method of claim 28, wherein the hotspot report comprises number of sessions in which a user has selected each hotspot.

30. The method of claim 28, wherein the hotspot report comprises number of times each hotspot has been viewed by a user.

31. The method of claim 28, wherein the hotspot report comprises an average view time that users spent viewing the content linked to each hotspot.

32. The method of claim 28, wherein the hotspot report comprises name and type of each hotspot.

33. The method of claim 28, wherein the hotspot report comprises a number of selections of each hotspot via a mouse.

34. The method of claim 28, wherein the hotspot report comprises percentage of viewers that clicked each hotspot.

35. A non-transitory machine-readable medium with instructions stored thereon, the instructions when executed operable to cause a computer to provide hypervideo application user information by:
 tracking and recording media viewed by a user, where media comprises hypervideo applications; and
 creating a user-configurable report, the report reflecting data regarding user access of the media,
 wherein the creating act further comprises the acts of:
 indicating, for each video-enhanced page in a hypervideo application, information regarding previous video-enhanced pages users viewed before a current video-enhanced page and from which the users proceeded to the current video-enhanced page;
 indicating information regarding next video-enhanced pages to which the users proceeded from the current video-enhanced page; and
 simultaneously displaying on a display the information regarding the previous video-enhanced pages, a list of media contained in the current video-enhanced page, and the information regarding the next video-enhanced pages,
 wherein the information regarding the previous video-enhanced pages comprises information regarding how viewing the current video-enhanced page was initiated, including one of user initiated and automatic activation, and paths the users took from the previous video-enhanced pages to the current video-enhanced page,
 wherein the information regarding the previous video-enhanced pages comprises percentage of total times when viewing the previous video-enhanced pages that users proceeded to the current video-enhanced page, and
 wherein the information regarding the next video-enhanced pages further comprises percentage of total views of the current video-enhanced page that result in a user proceeding to each of the next video-enhanced pages.

36. The non-transitory machine-readable medium of claim 35, wherein the user-configurable report comprises a report including data after a user-defined start date.

37. The non-transitory machine-readable medium of claim 35, wherein the user-configurable report comprises a report including data before a user-defined end date.

38. The non-transitory machine-readable medium of claim 35, the report data comprising a number of times each media has been viewed.

39. The non-transitory machine-readable medium of claim 35, wherein the media further comprises at least one of media types of video, image, HTML or audio.

40. The non-transitory machine-readable medium of claim 39, wherein the user configures which of the media types are to be included in the report.

41. The non-transitory machine-readable medium of claim 39, wherein each type of media is identified in the report via representation with a unique icon.

42. The non-transitory machine-readable medium of claim 38, wherein the number of times each media has been viewed does not include returning to a media in a path in the same session.

43. The non-transitory machine-readable medium of claim 35, wherein a number of media for which data is displayed in the report is selected by the user.

44. The non-transitory machine-readable medium of claim 35, wherein the report comprises a number of user sessions during which the media was viewed.

45. The non-transitory machine-readable medium of claim 35, wherein the report comprises a number of unique users to view a media.

46. The non-transitory machine-readable medium of claim 35, wherein the report comprises an average time users spent viewing each media.

47. The non-transitory machine-readable medium of claim 35, wherein the report sorts media by a number of times each media has been viewed.

48. The non-transitory machine-readable medium of claim 35, wherein a number of times each media has been viewed comprises both a total number of times a looping video has been viewed including views that result from looping, and a number of times the looping video has been viewed not as a result of looping.

49. The non-transitory machine-readable medium of claim 35, wherein the report comprises an indication of whether views of a particular media were user-initiated or automatic.

50. The non-transitory machine-readable medium of claim 35, wherein the report comprises an indication of whether video media is looping media.

51. The non-transitory machine-readable medium of claim 35, the report further reflecting a number of times each path has been taken through each hypervideo application.

52. The non-transitory machine-readable medium of claim 51, wherein indicating the number of times each path has been taken through each hypervideo application comprises displaying data for a user-selected number of paths.

53. The non-transitory machine-readable medium of claim 51, wherein indicating the number of times each path has been taken through each hypervideo application comprises indicating data for only those paths exceeding a user-defined minimum path length.

54. The non-transitory machine-readable medium of claim 51, wherein indicating the number of times each path has been taken through each hypervideo application comprises grouping paths together based on a user-defined number of same first pages in each path.

55. The non-transitory machine-readable medium of claim 35, wherein the information regarding the previous video-enhanced pages comprises data regarding the identity of the previous video-enhanced pages viewed before and linked to the current video-enhanced page.

56. The non-transitory machine-readable medium of claim 35, wherein the information regarding the previous video-enhanced pages comprises an average time users spent viewing the previous video-enhanced pages before proceeding to the current video-enhanced page.

57. The non-transitory machine-readable medium of claim 35, wherein the information regarding the previous video-enhanced pages comprises a number of user sessions for each previous video-enhanced page from which users have proceeded to the current video-enhanced page.

58. The non-transitory machine-readable medium of claim 35, wherein the information regarding the next video-enhanced pages comprises information about each hotspot on the current video-enhanced page and the next video-enhanced pages to which the hotspots are linked.

59. The non-transitory machine-readable medium of claim 58, wherein the information regarding the next video-enhanced pages comprises the media to which each hotspot is linked.

60. The non-transitory machine-readable medium of claim 58, wherein the information regarding the next video-enhanced pages further comprises an average time a user spends viewing the current video-enhanced page before progressing to each of the next video-enhanced pages.

61. The non-transitory machine-readable medium of claim 58, wherein the information regarding the next video-enhanced pages further comprises a number of user sessions in which a person proceeds from the current video-enhanced page to each of the next video-enhanced pages.

62. The non-transitory machine-readable medium of claim 35, the user-configurable report further comprising a hotspot report.

63. The non-transitory machine-readable medium of claim 62, the hotspot report comprising a number of sessions in which a user has selected each hotspot.

64. The non-transitory machine-readable medium of claim 62, the hotspot report comprising a number of times each hotspot has been viewed by a user.

65. The non-transitory machine-readable medium of claim 62, the hotspot report comprising an average view time that users spent viewing the content linked to each hotspot.

66. The non-transitory machine-readable medium of claim 62, the hotspot report comprising name and type of each hotspot.

67. The non-transitory machine-readable medium of claim 62, wherein the hotspot report comprises a number of selections of each hotspot via a mouse.

68. The non-transitory machine-readable medium of claim 62, wherein the hotspot report comprises a percentage of viewers that clicked each hotspot.

69. The non-transitory machine-readable medium of claim 62, wherein the hotspot report comprises identification of overlay used to represent the hotspot.

70. A method of providing hypervideo application user information, comprising the acts of:
  tracking and recording media viewed by a user, where media comprises hypervideo applications; and
  creating a user-configurable report, the report reflecting data regarding user viewing of advertising media via hotspots,
  wherein the creating act further comprises the acts of:
  indicating, for each video-enhanced page in a hypervideo application, information regarding previous video-enhanced pages users viewed before a current video-enhanced page and from which the users proceeded to the current video-enhanced page;
  indicating information regarding next video-enhanced pages to which the users proceeded from the current video-enhanced page; and
  simultaneously displaying on a display the information regarding the previous video-enhanced pages, a list of media contained in the current video-enhanced page, and the information regarding the next video-enhanced pages,
  wherein the information regarding the previous video-enhanced pages comprises information regarding how viewing the current video-enhanced page was initiated, including one of user initiated and automatic activation, and paths the users took from the previous video-enhanced pages to the current video-enhanced page,
  wherein the information regarding the previous video-enhanced pages comprises percentage of total times when viewing the previous video-enhanced pages that users proceeded to the current video-enhanced page, and
  wherein the information regarding the next video-enhanced pages further comprises percentage of total views of the current video-enhanced page that result in a user proceeding to each of the next video-enhanced pages.

71. The method of claim 70, wherein the report comprises the advertising media and an overlay image name.

72. The method of claim 70, wherein the report comprises a click-through URL (Uniform Resource Locator) linked to each advertising media hotspot.

73. The method of claim 70, wherein the report comprises a number of times each advertising media was retrieved within a user session.

74. The method of claim 70, wherein the report comprises a number of times each advertising media was retrieved by a unique user.

75. The method of claim 70, wherein the report comprises a percentage of times that a user who viewed the advertising hotspot has selected the hotspot.

76. The method of claim 70, wherein the report comprises an average amount of time that users view each advertising media hotspot.

77. A non-transitory machine-readable medium with instructions thereon, the instructions when executed operable to cause a computer to provide hypervideo application user information by:
  tracking and recording media viewed by a user, where media comprises hypervideo applications; and
  creating a user-configurable report, the report reflecting data regarding user viewing of advertising media via hotspots,
  wherein the creating act further comprises the acts of:
  indicating, for each video-enhanced page in a hypervideo application, information regarding previous video-enhanced pages users viewed before a current video-enhanced page and from which the users proceeded to the current video-enhanced page;
  indicating information regarding next video-enhanced pages to which the users proceeded from the current video-enhanced page; and
  simultaneously displaying on a display the information regarding the previous video-enhanced pages, a list of media contained in the current video-enhanced page, and the information regarding the next video-enhanced pages,
  wherein the information regarding the previous video-enhanced pages comprises information regarding how viewing the current video-enhanced page was initiated, including one of user initiated and automatic activation, and paths the users took from the previous video-enhanced pages to the current video-enhanced page,
  wherein the information regarding the previous video-enhanced pages comprises percentage of total times when viewing the previous video-enhanced pages that users proceeded to the current video-enhanced page, and
  wherein the information regarding the next video-enhanced pages further comprises percentage of total views of the current video-enhanced page that result in a user proceeding to each of the next video-enhanced pages.

78. The non-transitory machine-readable medium of claim 77, wherein the report comprises the advertising media and an overlay image name.

79. The non-transitory machine-readable medium of claim 77, wherein the report comprises a click-through URL (Uniform Resource Locator) linked to each advertising media hotspot.

80. The non-transitory machine-readable medium of claim 77, wherein the report comprises a number of times each advertising media was retrieved within a user session.

81. The non-transitory machine-readable medium of claim 77, wherein the report comprises a number of times each advertising media was retrieved by a unique user.

82. The non-transitory machine-readable medium of claim 77, wherein the report comprises a percentage of times that a user who viewed the advertising hotspot has selected the hotspot.

83. The non-transitory machine-readable medium of claim 77, wherein the report comprises an average amount of time that users view each advertising media hotspot.

84. The method of claim 28, the hotspot report comprising identification of an overlay used to represent the hotspot.

* * * * *